(12) United States Patent
Kim et al.

(10) Patent No.: US 9,196,883 B2
(45) Date of Patent: Nov. 24, 2015

(54) BATTERY MODULE

(75) Inventors: Myung-Chul Kim, Yongin-si (KR);
Hyun-Ye Lee, Yongin-si (KR);
Hee-Joon Jin, Yongin-si (KR);
Seung-Woo Yang, Yongin-si (KR);
Kwon Sohn, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 491 days.

(21) Appl. No.: 13/243,355

(22) Filed: Sep. 23, 2011

(65) Prior Publication Data

US 2012/0114985 A1 May 10, 2012

Related U.S. Application Data

(60) Provisional application No. 61/449,414, filed on Mar. 4, 2011, provisional application No. 61/452,046, filed on Mar. 11, 2011.

(30) Foreign Application Priority Data

Nov. 4, 2010 (KR) .................. 10-2010-0109179
Nov. 4, 2010 (KR) .................. 10-2010-0109180
Nov. 4, 2010 (KR) .................. 10-2010-0109181
Nov. 4, 2010 (KR) .................. 10-2010-0109182

(51) Int. Cl.
*H01M 2/10* (2006.01)
*H01M 10/647* (2014.01)
(Continued)

(52) U.S. Cl.
CPC ............ *H01M 2/1077* (2013.01); *H01M 2/206* (2013.01); *H01M 10/5004* (2013.01); *H01M 10/5016* (2013.01); *H01M 10/5032* (2013.01); *H01M 10/5065* (2013.01); *H01M 10/613* (2013.01); *H01M 10/625* (2013.01); *H01M 10/647* (2013.01); *H01M 10/6562* (2013.01); *Y02E 60/12* (2013.01)

(58) Field of Classification Search
None
See application file for complete search history.

(56) References Cited

U.S. PATENT DOCUMENTS 5,366,827 A 11/1994 Belanger et al.
5,436,089 A 7/1995 Fedele
(Continued)

FOREIGN PATENT DOCUMENTS

JP 2000-195480 7/2000
JP 2006-012841 A 1/2006
(Continued)

OTHER PUBLICATIONS

Korean Patent No. KR-10-0881640 dated Jan. 28, 2009 in the name of LG Chemical Ltd. (corresponds to KR 10-2006-0131320 (10 pgs.).
(Continued)

*Primary Examiner* — Jonathan Crepeau
(74) *Attorney, Agent, or Firm* — Christie, Parker & Hale, LLP (57) ABSTRACT

A battery module including a battery array including: a plurality of battery cells, each including a first surface at a first end of the battery cell; an electrode terminal at the first end; a second surface at a second end of the battery cell opposite the first end; and a side surface extending between the first and second ends, the second surfaces of first and second battery cells of the plurality of battery cells facing each other.

17 Claims, 8 Drawing Sheets

(51) Int. Cl.
*H01M 2/20* (2006.01)
*H01M 10/613* (2014.01)
*H01M 10/625* (2014.01)
*H01M 10/6562* (2014.01)

(56) References Cited

U.S. PATENT DOCUMENTS

| | | | |
|---|---|---|---|
| 5,585,204 | A | 12/1996 | Oshida et al. |
| 5,795,193 | A | 8/1998 | Yang |
| 5,977,746 | A | 11/1999 | Hershberger et al. |
| 6,641,951 | B1 | 11/2003 | Vutetakis et al. |
| 6,790,554 | B2 | 9/2004 | May et al. |
| 7,332,244 | B2 * | 2/2008 | Uemoto et al. ............... 429/185 |
| 7,605,562 | B2 | 10/2009 | Kim |
| 7,820,322 | B2 | 10/2010 | Jung et al. |
| 8,039,141 | B2 | 10/2011 | Jeon et al. |
| 8,623,536 | B2 | 1/2014 | Jeon et al. |
| 2001/0004200 | A1 | 6/2001 | Sakaue et al. |
| 2003/0193313 | A1 | 10/2003 | Takedomi et al. |
| 2003/0215702 | A1 | 11/2003 | Tanjou et al. |
| 2004/0013936 | A1 | 1/2004 | Barrett Jr |
| 2004/0142238 | A1 | 7/2004 | Asahina et al. |
| 2005/0202315 | A1 | 9/2005 | Sugeno et al. |
| 2006/0073375 | A1 | 4/2006 | Hong et al. |
| 2006/0093899 | A1 | 5/2006 | Jeon et al. |
| 2006/0115719 | A1 * | 6/2006 | Jeon et al. .................. 429/156 |
| 2006/0115726 | A1 | 6/2006 | Jung et al. |
| 2006/0177733 | A1 | 8/2006 | Ha et al. |
| 2006/0216579 | A1 | 9/2006 | Cho |
| 2007/0020516 | A1 * | 1/2007 | Yoon ........................... 429/152 |
| 2007/0134524 | A1 | 6/2007 | Cho et al. |
| 2007/0202364 | A1 | 8/2007 | Uh et al. |
| 2007/0264562 | A1 | 11/2007 | Kang et al. |
| 2008/0057393 | A1 | 3/2008 | Onuki et al. |
| 2008/0131765 | A1 | 6/2008 | Imanaga et al. |
| 2008/0268296 | A1 | 10/2008 | Larsen |
| 2009/0017366 | A1 | 1/2009 | Wood et al. |
| 2009/0061301 | A1 | 3/2009 | Planck |
| 2009/0061305 | A1 | 3/2009 | Nishida et al. |
| 2009/0111010 | A1 | 4/2009 | Okada et al. |
| 2009/0155675 | A1 * | 6/2009 | Houchin-Miller ............ 429/120 |
| 2009/0263705 | A1 | 10/2009 | Anantharaman |
| 2010/0021802 | A1 | 1/2010 | Yang et al. |
| 2010/0047682 | A1 | 2/2010 | Houchin-Miller et al. |
| 2010/0073005 | A1 | 3/2010 | Yano et al. |
| 2010/0092849 | A1 | 4/2010 | Wood et al. |
| 2010/0167115 | A1 | 7/2010 | Okada et al. |
| 2010/0173181 | A1 | 7/2010 | Okada |
| 2011/0097614 | A1 | 4/2011 | Kim |
| 2011/0104548 | A1 * | 5/2011 | Saito et al. .................. 429/120 |
| 2011/0151298 | A1 | 6/2011 | Kim |
| 2011/0151299 | A1 * | 6/2011 | Park et al. ..................... 429/99 |
| 2011/0151311 | A1 | 6/2011 | Lee et al. |
| 2011/0151314 | A1 | 6/2011 | Ogawa |
| 2011/0318625 | A1 * | 12/2011 | Yajima et al. ................ 429/120 |
| 2012/0028099 | A1 | 2/2012 | Aoki |
| 2012/0115011 | A1 * | 5/2012 | Kim ............................. 429/156 |

FOREIGN PATENT DOCUMENTS

| | | |
|---|---|---|
| JP | 2009-110833 A | 5/2009 |
| JP | 2011-129505 | 6/2011 |
| JP | 2012-33306 | 2/2012 |
| KR | 1999-018295 | 3/1999 |
| KR | 10-2006-0099216 | 9/2006 |
| KR | 10-2006-0102852 | 9/2006 |
| KR | 10-2006-0116424 | 11/2006 |
| KR | 10-2006-0131320 | 12/2006 |
| KR | 10-2007-0043434 | 4/2007 |
| KR | 10-0709261 B1 | 4/2007 |
| KR | 10-2007-0068608 | 7/2007 |
| KR | 10-2008-0042965 | 5/2008 |
| KR | 10-2008-0102547 | 11/2008 |
| KR | 10-2010-0006826 | 1/2010 |
| KR | 10-2010-0034695 | 4/2010 |
| KR | 10-2010-0041442 | 4/2010 |
| KR | 10-2010-0064776 | 6/2010 |
| WO | WO 2007/011144 A1 | 1/2007 |
| WO | WO 2008/027343 A1 | 3/2008 |
| WO | WO 2010/021293 A1 | 2/2010 |
| WO | WO 2010/111647 * | 9/2010 |

OTHER PUBLICATIONS

EPO Search Report dated Feb. 17, 2014, for corresponding European Patent application 1187693.4, (5 pages).
EPO Office action dated Apr. 15, 2014, for European Patent application 1187704.9, (5 pages).
U.S. Office Action dated Nov. 6, 2013 for cross reference U.S. Appl. No. 13/241,522 (10 pages).
U.S. Office action dated Sep. 13, 2012, for cross reference U.S. Appl. No. 13/243,618, (15 pages).
U.S. Office action dated Mar. 14, 2013, for cross reference U.S. Appl. No. 13/243,618, (14 pages).
Korean Patent Abstracts for Korean Patent 100232626 B1 dated Sep. 7, 1999, corresponding to Korean Publication 1999-018295 dated Mar. 15, 1999.
U.S. Office action dated May 21, 2014, issued to cross reference U.S. Appl. No. 13/243,618, (14 pages).
Heat Shrink China, *0.6~36kv Bus bar insulation tubes,* Originally published Aug. 25, 2007, http://www.heatshrinkchina.com/highvoltage-bus-bar-tube.htm, (2 pages).
English machine translation of Korean Patent 10-0897091 dated May 4, 2009, corresponding to Korean Publication 10-2008-0102547 dated Nov. 26, 2008 listed above, (14 pages).
U.S. Office action dated Dec. 31, 2012, for cross reference U.S. Appl. No. 13/238,642, (16 pages).
U.S. Office action dated Jun. 7, 2013, for cross reference U.S. Appl. No. 13/238,642, (14 pages).
U.S. Office action dated Jul. 31, 2014, for cross reference U.S. Appl. No. 13/238,642, (17 pages).
U.S. Office action dated Feb. 21, 2013, for cross reference U.S. Appl. No. 13/064,358 (Now U.S. Pat. No. 8,642,206), (10 pages).
U.S. Office action dated May 1, 2013, for cross reference U.S. Appl. No. 13/239,227, (13 pages).
U.S. Office action dated Nov. 8, 2013, for cross reference U.S. Appl. No. 13/239,227, (13 pages).
U.S. Office action dated Jul. 14, 2014, for cross reference U.S. Appl. No. 13/239,227, (11 pages).
U.S. Notice of Allowance dated Oct. 23, 2014, for cross reference U.S. Appl. No. 13/243,618, (12 pages).
U.S. Office action dated Jan. 28, 2015, for cross reference U.S. Appl. No. 13/238,642, (23 pages).
U.S. Office action dated Jan. 29, 2015, for cross reference U.S. Appl. No. 13/239,227, (14 pages).
EPO Search Report dated Mar. 18, 2015, for corresponding European Patent application 11187615.7, (4 pages).

* cited by examiner

BATTERY MODULE

CROSS-REFERENCE TO RELATED APPLICATIONS

This application claims priority to and the benefit of U.S. Provisional Application Nos. 61/449,414 and 61/452,046, filed on Mar. 4, 2011 and Mar. 11, 2011, respectively, in the United States Patent and Trademark Office, and each of Korean Patent Application Nos. 10-2010-0109179, 10-2010-0109180, 10-2010-0109181, and 10-2010-0109182, each filed on Nov. 4, 2010 in the Korean Intellectual Property Office, the entire content of all which are incorporated herein by reference.

BACKGROUND

1. Field

Aspects of embodiments of the present invention relate to a battery module.

2. Description of the Related Art

In general, secondary batteries can be reused by charging and discharging, unlike primary batteries that cannot be charged. The secondary batteries are used as energy sources for mobile devices, electric vehicles, hybrid vehicles, electric bicycles, and uninterruptible power supplies, and may be used in a single battery type or a battery module type composed of a plurality of batteries connected in one unit, in accordance with the type of available external devices.

Although small mobile devices, such as mobile phones, can operate for a predetermined time with output and capacity of a single battery, electric modules are preferable due to output and capacity in order to operate electric vehicles and hybrid vehicles, which consume a large amount of electricity, with high power for a long time. The battery modules are used by connecting a required amount of batteries in parallel or series in accordance with output and capacity.

SUMMARY

According to an aspect of embodiments of the present invention, a battery module increases usefulness of an installation space, such as in a vehicle, due to a decreased height.

A battery module according to an embodiment of the present invention includes a battery array with unit battery cells, and fixing members.

The battery cell has electrode terminals, a terminal surface with a vent exposed, and a bottom side opposite to the terminal surface. At least two or more pairs of battery cells, which are disposed horizontally with the bottom sides opposite to each other, may be stacked in the battery array. The fixing members fix the battery array.

Further, a battery module according to an embodiment of the present invention may include first supporting members. The first supporting members may be disposed between the bottom sides of the pair of batteries.

Further, a battery module according to an embodiment of the present invention may include insulating members. The insulating members may be disposed between a pair of stacked battery cells when two or more pairs of battery cells are stacked.

Further, a battery module according to an embodiment of the present invention may include end plates covering the terminals surfaces of the battery array such that the electrode terminals and the vents are exposed.

Further, the fixing members may include upper and lower fixing members. The upper and lower fixing members may be disposed on and beneath the battery array and coupled to the end plates, thereby restricting upward and downward movement of the battery array. Further, supporting members may be included. The supporting members may include one or more beams, disposed between the bottom sides of the pair of batteries, and coupled to the upper and lower fixing members. Further, the upper and lower fixing members and the supporting members may be thread-fastened. In this configuration, the supporting members may have a female-thread made of metal by double injection molding. In one embodiment, the supporting member may be an H-beam.

Further, the fixing members may include side fixing members. The side fixing members may be disposed on both sides of the battery array and coupled to the end plates, thereby restricting left and right movement of the battery array.

According to an embodiment of the present invention, a battery module includes a battery array including: a plurality of battery cells, each including a first surface at a first end of the battery cell; an electrode terminal at the first end; a second surface at a second end of the battery cell opposite the first end; and a side surface extending between the first and second ends, and the second surfaces of first and second battery cells of the plurality of battery cells face each other.

In one embodiment, the battery module further includes end plates at opposite outer ends of the battery array adjacent the first ends of the battery cells, the end plates having terminal openings exposing the electrode terminals; and at least one fixing member connecting the end plates.

In one embodiment, at least one another first battery cell of the plurality of battery cells is stacked with the first battery cell in a stacking direction, the side surfaces of the first battery cell and the at least one another first battery cell facing each other, at least one another second battery cell of the plurality of battery cells is stacked with the second battery cell in the stacking direction, the side surfaces of the second battery cell and the at least one another second battery cell facing each other, and the second surfaces of the at least one another first battery cell and the at least one another second battery cell face each other.

A height of the battery array in the stacking direction may be less than a length of a battery cell of the plurality of battery cells in a direction extending between the first and second ends.

The battery module may further include an insulating plate between battery cells of the plurality of battery cells stacked adjacent one another.

The battery module may further include a supporting member between the second surfaces of the first and second battery cells.

In one embodiment, each of the battery cells has a generally hexahedral shape, the side surface is a first side surface, and each of the battery cells further includes a second side surface opposite the first side surface and extending between the first and second ends, and the battery module further includes first and second fixing members adjacent opposite outer second side surfaces of the stacked battery cells.

In one embodiment, at least one of the first and second fixing members includes a plurality of bars.

In one embodiment, at least one of the first and second fixing members includes a plate.

The battery module may further include a supporting member between the second surfaces of the first and second battery cells, and the supporting member may be fixed between the first and second fixing members.

The supporting member may include a thread-fastening portion, and the first and second fixing members may have fastener holes for fastening the first and second fixing members to the thread-fastening portion.

The supporting member may include an insulating material, and the thread-fastening portion may include a metal.

In one embodiment, each of the battery cells further includes a pair of third side surfaces opposite each other, extending between the first and second side surfaces, and extending between the first and second ends, and the battery module further includes third fixing members adjacent the third side surfaces of battery cells of the stacked battery cells.

Each of the third fixing members may have a plurality of heat dissipation holes spaced apart along a lengthwise direction.

In one embodiment, the battery module further includes end plates at opposite outer ends of the battery array adjacent the first ends of the battery cells, the end plates having terminal openings exposing the electrode terminals, and each of the battery cells further includes a vent at the first end, and the end plates have exhaust openings at locations corresponding to the vents.

The battery module may be configured for driving a motor of an electric vehicle or a hybrid electric vehicle.

The battery module may be electrically connected to at least one another battery module.

According to an aspect of embodiments of the present invention, a battery module may be efficiently installed and have desired output and capacity in a battery installation space having limited height, such as of a vehicle. As such, battery modules according to embodiments of the present invention are particularly applicable as a motor-driving power source for propelling hybrid vehicles or electric vehicles.

BRIEF DESCRIPTION OF THE DRAWINGS

These and/or other features and aspects of the present invention will become apparent and more readily appreciated by those of ordinary skill in the art from the following description of some exemplary embodiments, taken in conjunction with the accompanying drawings.

DETAILED DESCRIPTION

Some exemplary embodiments of the present invention will now be described with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Terms representing directions, such as "up," "down," "left," or "right" used herein are considered to be based on the status shown in the drawings, if not specifically defined or stated, and should not be construed as limiting the invention to any particular directions or orientations. Further, the same reference numerals generally represent the same parts throughout the following description.

The term "battery array" used in the comparative examples and embodiments of the present invention is used to describe a bundle of battery cells arranged and stacked together, such as in predetermined configurations.

Figure 1:
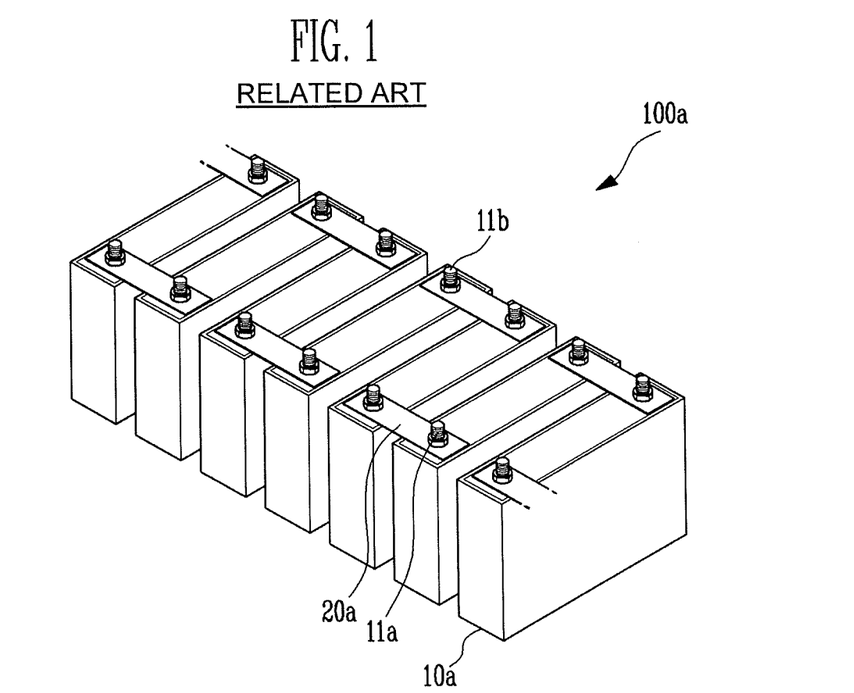
FIG. 1 is a perspective view showing a portion of a battery module according to a comparative example.

A battery module according to a comparative example is described with reference to FIG. 1. FIG. 1 is a perspective view showing a portion of a battery module according to a comparative example.

A battery module 100a of a comparative example is a longitudinal type of battery module, as shown in FIG. 1. Each battery 10a has an anode terminal 11b and a cathode terminal 11a on the top. The batteries 10a are longitudinally arranged with the electrode terminals 11a and 11b arranged in a predetermined direction. In this arrangement, the electrode terminals 11a and 11b are connected in series or in parallel, depending on a requirement. Therefore, a user may implement the longitudinal type of battery module 100a having desired output or capacity.

In general, electric vehicles are equipped with a battery module at the position of the existing gasoline or diesel fuel tank. However, the battery module may be disposed under the seats in the vehicles, such as when it is required to distribute the weight or an additional installation space is required. In this case, the height of the battery module may be a problem due to a limited height of the space.

Figure 2:
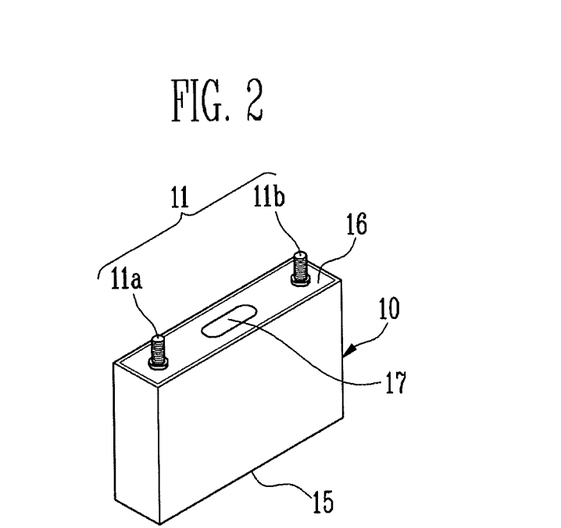
FIG. 2 is a perspective view of a battery cell, according to an embodiment of the present invention.

A battery cell according to an embodiment of the present invention is described with reference to FIG. 2. FIG. 2 is a perspective view showing a battery cell 10 according to an embodiment of the present invention.

In an exemplary embodiment, the battery cells 10 are formed having generally hexahedral shapes. A terminal surface 16 is provided having both electrode terminals 11 (an anode terminal 11b and a cathode terminal 11a) and a vent 17.

The vent 17 may be formed at the center of the terminal surface 16. The vent 17 allows a gas produced in the battery cell 10 to be discharged. The electrode terminals 11, in one embodiment, are formed at both sides of the vent 17. Both electrode terminals 11 function as paths allowing the current produced in the battery cell 10 to flow to the outside. An electrode assembly (not shown) and a cap assembly (not shown) in the battery cell 10 are not the subject components of the internal configuration of the battery cell 10, and a detailed description thereof is not provided herein. Further, the opposite side to the terminal surface 16 is referred to as a bottom side 15 herein.

Figure 3:
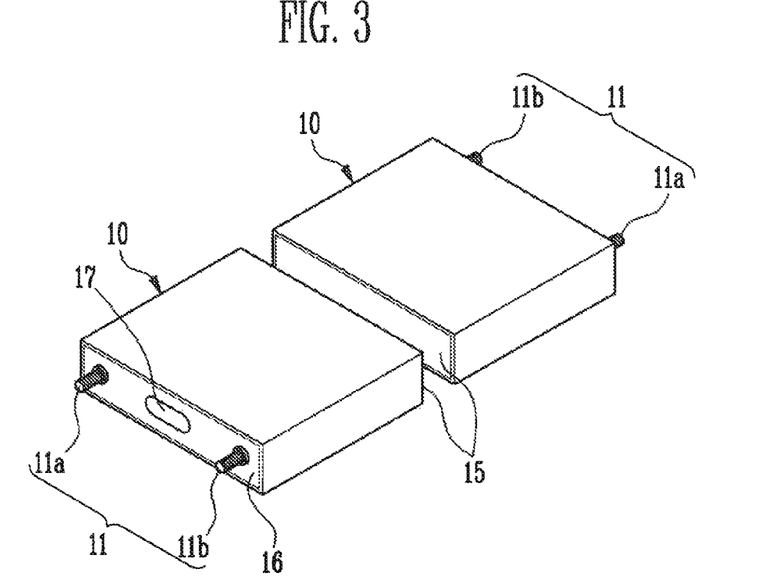
FIG. 3 is a perspective view of a pair of battery cells of a battery array, according to an embodiment of the present invention.
Figure 4:
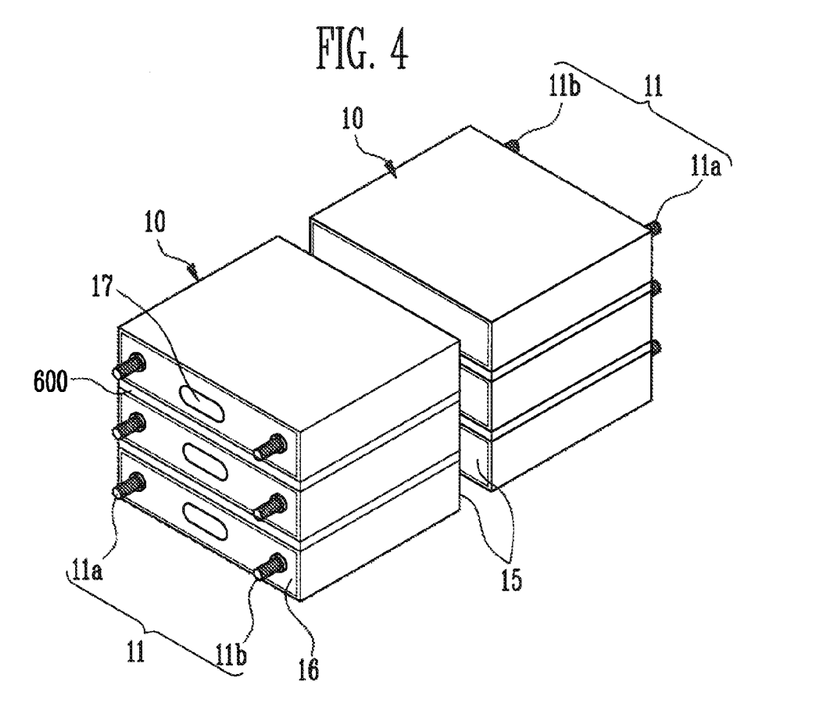
FIG. 4 is a perspective view of a battery array, according to an embodiment of the present invention.

An arrangement of the battery cells 10 in a battery array according to embodiments of the present invention is described with reference to FIGS. 3 to 5. FIG. 3 is a perspective view of a pair of battery cells of a battery array, according to an embodiment of the present invention; FIG. 4 is an exploded perspective view showing a battery array of a pair of stacks of stacked batteries; and FIG. 5 is a schematic view comparing heights of a transverse type of battery module and a longitudinal type of battery module.

As shown in FIG. 3, the battery cells 10 are transversely disposed in a battery array such that the bottom sides 15 of two battery cells 10 face each other. The electrode terminals 11 are disposed to face the outside. The pair of battery cells 10 disposed as described above may be stacked in two layers or more, as shown in FIG. 4. The electrode terminals 11 of the upper and lower stacked battery cells 10 may have the same polarity or opposite polarities. This will be described in further detail below with regard to connections between battery modules according to an embodiment of the present invention.

In one embodiment, an insulating plate 600 may be disposed for electrical insulation between the battery cells 10 that are vertically stacked. The insulating plate 600 prevents or substantially prevents direct contact between the battery cells 10 and prevents or substantially prevents a short between the battery cells 10 by electrically insulating the battery cells 10.

Figure 5:
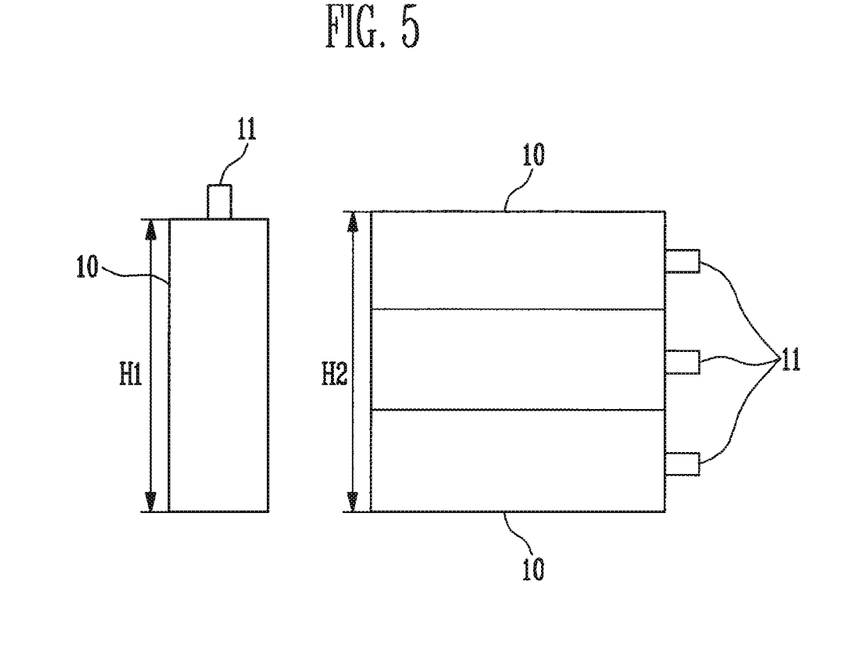
FIG. 5 is a schematic side view comparing heights of a transverse type of battery module and a longitudinal type of battery module.

As shown in FIG. 5, in one embodiment, a longitudinal length H1 of the battery cell 10 is two to three times greater than a transverse length H2 of the battery cell 10, or that of a component, such as an electrode assembly (not shown), in common battery cells. That is, the transverse type of battery module according to an embodiment of the present invention having battery cells stacked in two layers may be smaller in height than a longitudinal type of battery module. Further, a transverse type of battery module according to an embodiment of the present invention having battery cells stacked in three layers may be advantageous in height, considering the electrode terminals of the longitudinal type of battery module and the connecting members (not shown) or the insulating members (not shown) which connect the electrode terminals 11.

Figure 6:
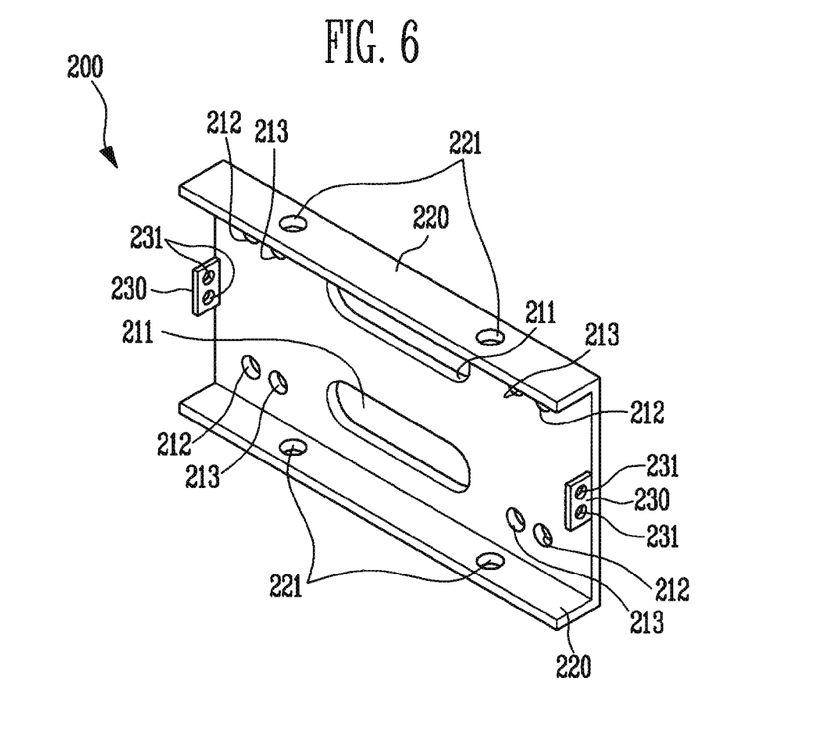
FIG. 6 is a perspective view of an end plate of a battery module, according to an embodiment of the present invention.
Figure 7:
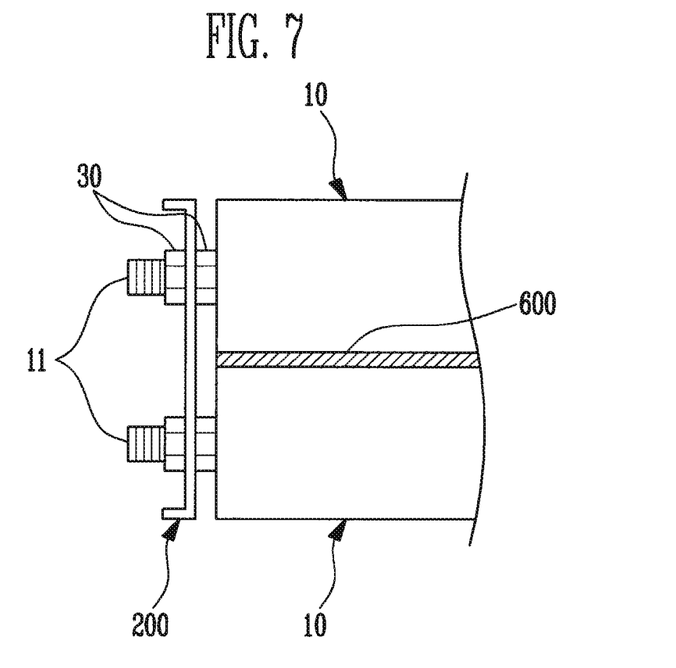
FIG. 7 is a side view showing a connection structure between an end plate and a battery cell of a battery module, according to an embodiment of the present invention.

An end plate of a battery module, according to an embodiment of the present invention, is described with reference to FIGS. 6 and 7. FIG. 6 is a perspective view showing an end plate 200 according to an embodiment of the present invention; and FIG. 7 is a side view showing a connection structure between the end plate 200 and battery cells 10 according to an embodiment of the present invention.

The end plate 200, in one embodiment, is a fixing member for fixing the stacked battery cells 10 described above. The end plate 200 is attached to the terminal surfaces 16 (see FIG. 4) of the stacked battery cells 10 and fixes the battery cells 10 with other components. The end plate 200 is used for a transverse type of battery module with battery cells stacked, such as in two layers as shown in FIG. 7.

In one embodiment, a pair of first fastening holes 221 for thread-fastening is formed at the top and the bottom, respectively, of the end plate 200. In one embodiment, first extenders 220 extending at a right angle from the top and the bottom of the end plate 200 are further formed and include the first fastening holes 221. The first fastening holes 221 may be formed vertically through the first extenders 220.

In one embodiment, a pair of second fastening holes 231 for thread-fastening is formed at both sides, respectively, of the end plate 200. Second extenders 230 may extend from both sides of the end plate 200 in the same way as the first extenders 220 described above, to include the second fastening holes 231. The second fastening holes 231 may be formed transversely through the second extenders 230.

In one embodiment, exhaust holes 211 are formed through (e.g., at upper and lower regions of) the center of the end plate 200. The exhaust holes 211, in one embodiment, are formed in a shape and at a position corresponding to the vent 17 (see FIG. 3) described above.

Further, electrode holes 212 are formed at both sides of the exhaust holes 211. In one embodiment, four electrode holes 212 are formed in the battery module having battery cells in two layers. As shown in FIG. 7, the electrode terminals 11 of the battery cell 10 are exposed through the electrode holes 212. In this structure, the battery cells 10 and the end plates 200 may be fixed by forming a thread on the outer circumferential surfaces of the electrode terminals 11 and tightening nuts on both sides of the end plates 200.

In one embodiment, as shown in FIG. 6, detecting holes 213 may be formed in the end plate 200, such as between the electrode holes 212 and the exhaust holes 211. The detecting holes 213 allow detecting portions (not shown) of a variety of equipment to be inserted to test the voltage of the battery cells 10 in the battery module.

Figure 8:
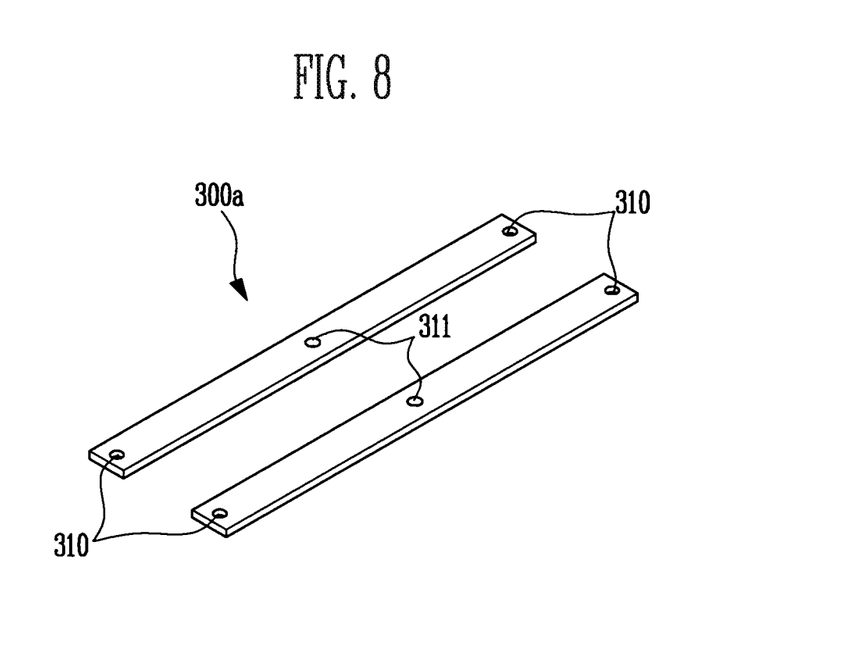
FIGS. 8 and 9 are perspective views of upper and lower fixing members, according to embodiments of the present invention.
Figure 9:
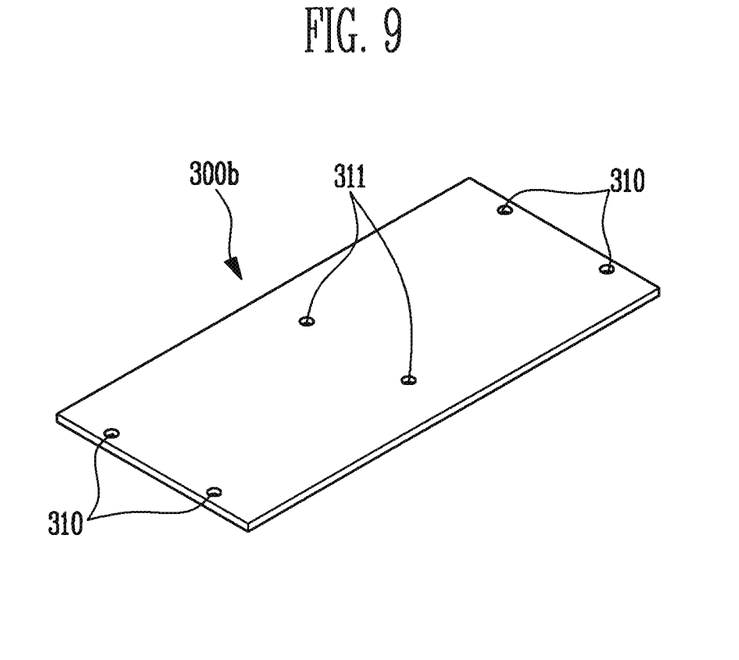

Upper and lower fixing members of a battery module, according to an embodiment of the present invention, are described below with reference to FIGS. 8 and 9. FIGS. 8 and 9 are perspective views showing upper and lower fixing members, according to embodiments of the present invention. The upper and lower fixing members, in one embodiment, are disposed on and beneath the battery array to fix the battery array.

In one embodiment, the upper and lower fixing members may be two fixing frames 300a having a length (e.g., a predetermined length), as shown in FIG. 8, or, in another embodiment, may be fixing plates 300b having a length (e.g., a predetermined length), as shown in FIG. 9. Two first through-holes 310 are formed at both ends of the fixing frames 300a or the fixing plates 300b. The first through-holes 310 correspond to the first fastening holes 221 of the end plates 200 (see FIG. 6) and may be fixed by thread-fastening. In one embodiment, second through-holes 311 are formed at a center portion of the fixing frames 300a and the fixing plates 300b. The second through-holes 311 are used to fasten another member (i.e. a supporting member), similar to the first through holes 310.

Figure 10:
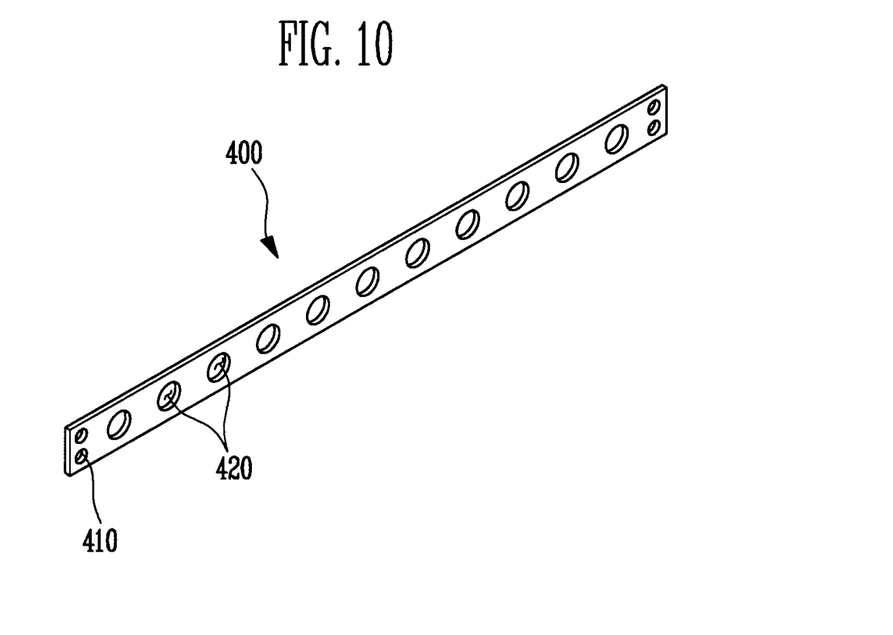
FIG. 10 is a front perspective view of a side fixing member, according to an embodiment of the present invention.

Side fixing members of a battery module, according to an embodiment of the present invention, are described with reference to FIG. 10. FIG. 10 is a front perspective view of a side fixing member 400 according to an embodiment of the present invention.

In one embodiment, the side fixing members 400 are attached to both sides of the battery array to fix the battery array. The side fixing members 400 may be frames having a predetermined length. A pair of third through-holes 410 is formed at both ends of the side fixing member 400. The third through-holes 410 correspond to the second fastening holes 231 of the end plates 200 (see FIG. 6) and may be fixed by thread-fastening.

In one embodiment, heat-dissipating holes 420 for dissipating heat and reducing the weight may be formed through the side fixing member 400.

Figure 11A:
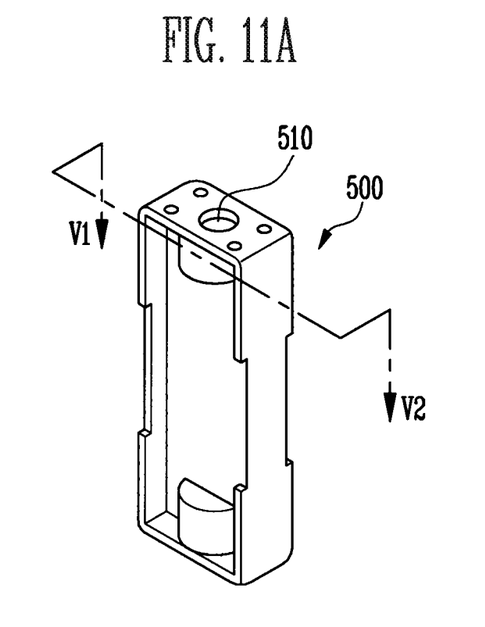
FIG. 11A is a perspective view of a supporting member of a battery module, according to an embodiment of the present invention.
Figure 11B:
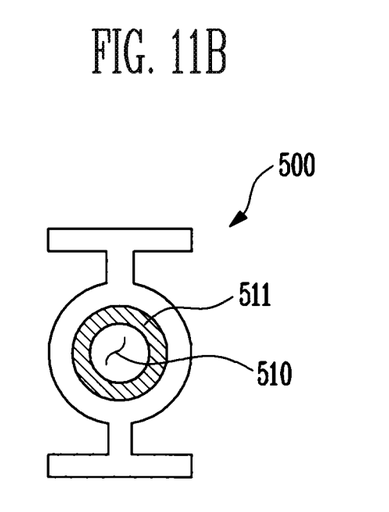
FIG. 11B is a cross-sectional view of the supporting member of FIG. 11A, taken along the line V1-V2.

Supporting members and horizontal insulating members are described with reference to FIGS. 11A, 11B, and 12. FIG. 11A is a perspective view showing a supporting member 500 according to an embodiment of the present invention; FIG. 11B is a cross-sectional view of the supporting member 500, taken along the line V1-V2 of FIG. 11A; and FIG. 12 is an exploded perspective view showing a battery module 100 according to an embodiment of the present invention.

Figure 12:
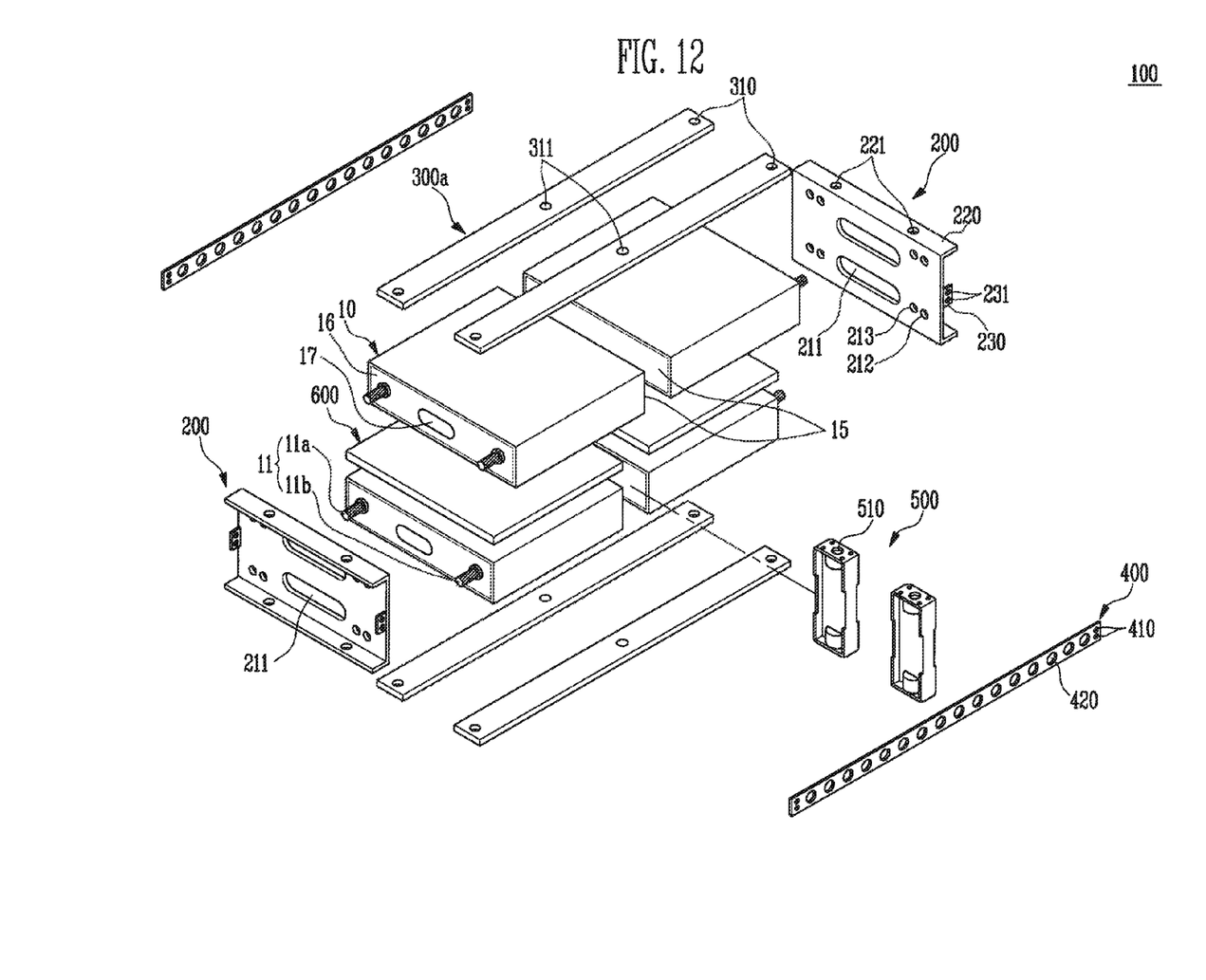
FIG. 12 is an exploded perspective view of a battery module according to an embodiment of the present invention.

In one embodiment, as shown in FIG. 12, the supporting member 500 is disposed between the bottom sides 15 in the battery array for support and insulation, and the horizontal insulating members 600 are disposed between the stacked battery cells 10 for insulation.

The supporting member 500 may be disposed to insulate the bottom sides 15 of the battery cells 10, such as in a plate shape, but may have any other suitable shape. The battery cells 10 typically expand by a small amount when being repeatedly charged and discharged. In the battery module 100, a distance between both terminal surfaces 16 disposed in one array may be large, and the supporting member 500 (e.g., a supporting member having an H-beam shape, as shown in FIGS. 11A and 11B) may allow the vertical fixing member 300*a* to sufficiently press the battery cells 10. "H-beam" as used herein refers to a beam formed in an H-shape. Thread-fastening portions 510 may be formed at the upper and lower ends of the H-beam to be connected with the fixing frames 300*a* or the fixing plates 300*b*. In one embodiment, a metal layer 511 may be further formed by double injection molding to reinforce the strength of the thread-fastening portions 510. The thread-fastening portion 510 and the second through-hole 311 described above may be coupled by a bolt or other fastener in assembling the battery module 100.

The horizontal insulating members 600 are formed in plate shapes and disposed between the battery cells 10 stacked vertically. The horizontal insulating member 600 insulates two battery cells 10 stacked vertically by preventing or substantially preventing direct contact between the two battery cells 10.

Figure 13:
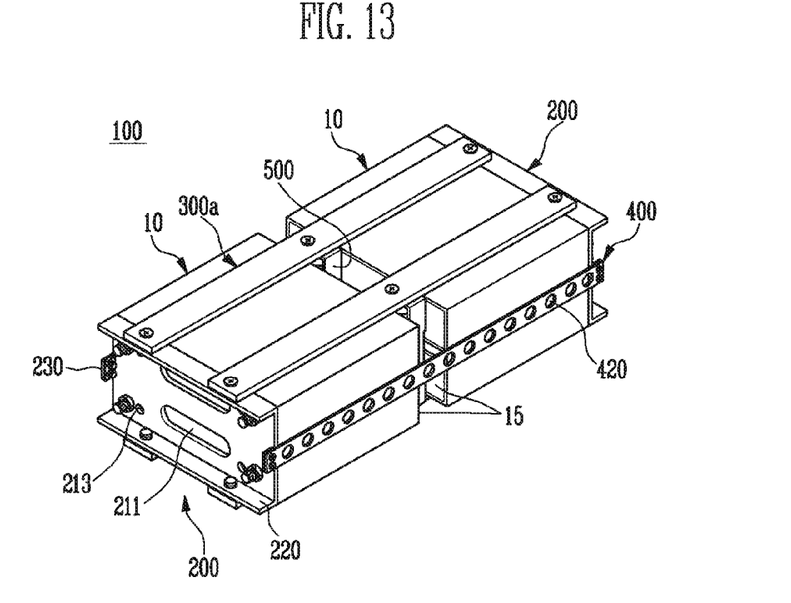
FIG. 13 is a perspective view of the battery module of FIG. 12, shown in an assembled state.

The connection relationship and operation of the components of the battery module 100 are described in further detail with reference to FIGS. 12 and 13. FIG. 12 is an exploded perspective view of the battery module 100 according to an embodiment of the present invention, and FIG. 13 is a perspective view of the battery module shown in an assembled state.

As described above, a pair of battery cells 10 is stacked with the bottom sides 15 facing each other, thereby forming the battery array. The horizontal insulating members 600 are disposed between the upper and lower stacked battery cells 10 for insulation and the supporting members 500 are disposed (e.g., vertically) between the battery cells 10 with the bottom sides 15 facing each other, such as for support and insulation.

The end plates 200 are fastened to both terminal surfaces 16 of the battery array. In one embodiment, the electrode terminals 11 of the battery cells 10 are exposed to the outside through the electrode holes of the end plates 200. Further, when the vents 17 are open, the vents 17 and the corresponding exhaust holes 211 of the end plates 200 form a continuous exhaust channel.

The upper and lower fixing members 300*a*, 300*b*, as described above, are fastened and fixed to the end plates 200 at both ends of the battery array and to the supporting members 500, at the top and the bottom of the battery array. Further, in one embodiment, the side fixing members 400 are fastened and fixed to the end plates 200, at both sides of the battery array. In one embodiment, the heat produced from the battery cells 10 may be easily discharged through the heat-dissipating holes 420.

The battery module 100 assembled as described above is shown in FIG. 13.

Figure 14:
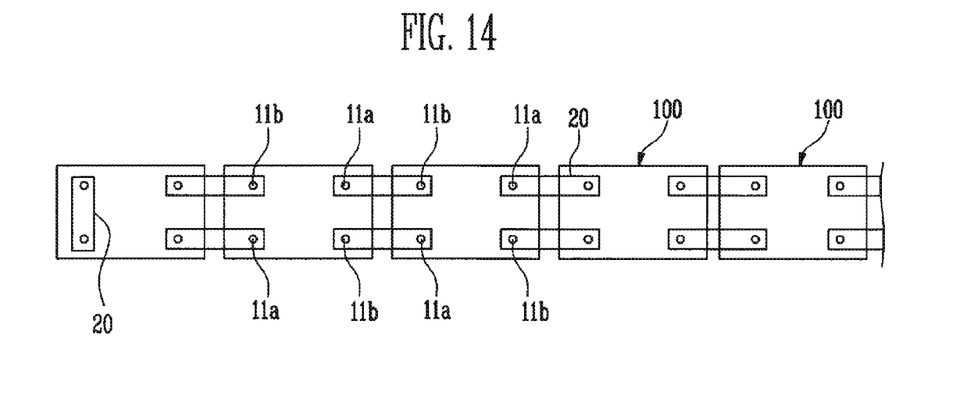
FIG. 14 is a schematic top view of a plurality of battery modules connected to one another.

A connection relationship of a plurality of battery modules 100 is described with reference to FIG. 14. FIG. 14 is a schematic top view of a plurality of the battery modules 100 connected to one another with connection structures between the battery modules 100.

The electrodes of the battery modules 100 are connected by specific conductive connecting members 20. Series connection of the battery modules 100 is shown in FIG. 14. First, the battery module 100 is provided with a battery cell therein, with the anode electrode 11*b* at the left side and the cathode electrode 11*a* at the right side, on the top. Further, the battery module 100 is provided with a battery cell therein, with the cathode electrode 11*a* at the left side and the anode electrode 11*b* at the right side, on the bottom. That is, the battery modules 100 may be arranged with the electrodes 11 opposite to each other on the top and the bottom.

Next, the electrode terminals 11 of adjacent battery modules 100 are connected by the conductive connecting members 20. When there are no more adjacent electrode terminals 11, the electrode terminals on the top and the bottom are connected, thereby forming one electric path.

As described above, according to embodiments of the present invention, a battery module may be efficiently installed and have desired output and capacity in a battery installation space having limited height, such as of a vehicle. As such, battery modules according to embodiments of the present invention are particularly applicable as a motor-driving power source for propelling hybrid vehicles or electric vehicles.

Although some exemplary embodiments of the present invention are described above, the scope of the present invention is not limited to the described embodiments. Rather, it will be understood by those of ordinary skill in the art that various changes in form and details may be made without departing from the spirit and scope of the present invention as set forth in the following claims.

What is claimed is:

1. A battery module comprising a battery array comprising:
 a plurality of battery cells, each having a generally hexahedral shape and comprising:
  a first surface at a first end of the battery cell;
  a pair of electrode terminals at the first end;
  a second surface at a second end of the battery cell opposite the first end; and
  a side surface extending between the first and second ends,
 wherein the second surfaces of first and second battery cells of the plurality of battery cells face each other;
 first and second fixing members adjacent outer side surfaces of the plurality of battery cells; and
 a plurality of supporting members between the second surfaces of the first and second battery cells,
 wherein at least one another first battery cell of the plurality of battery cells is stacked over the first battery cell and at least one another second battery cell of the plurality of battery cells is stacked over the second battery cell,
 wherein the second surfaces of the at least one another first battery cell and the at least one another second battery cell face each other, and
 wherein each of the supporting members comprises a thread-fastening portion, and the first and second fixing members have fastener holes for fastening the first and second fixing members to the thread-fastening portion.

2. The battery module of claim 1, further comprising end plates at opposite outer ends of the battery array adjacent the first ends of the battery cells, the end plates having terminal openings exposing the electrode terminals, wherein at least one of the fixing members connects the end plates.

3. The battery module of claim 1,
wherein the side surfaces of the first battery cell and the at least one another first battery cell face each other, and
wherein the side surfaces of the second battery cell and the at least one another second battery cell face each other.

4. A battery module comprising a battery array comprising:
a plurality of battery cells, each comprising:
a first surface at a first end of the battery cell;
a pair of electrode terminals at the first end;
a second surface at a second end of the battery cell opposite the first end; and
a side surface extending between the first and second ends,
wherein the second surfaces of first and second battery cells of the plurality of battery cells face each other;
first and second fixing members adjacent outer side surfaces of the plurality of battery cells; and
a supporting member between the second surfaces of the first and second battery cells,
wherein the supporting member comprises a thread-fastening portion, and the first and second fixing members have fastener holes for fastening the first and second fixing members to the thread-fastening portion,
wherein at least one another first battery cell of the plurality of battery cells is stacked with the first battery cell in a stacking direction, the side surfaces of the first battery cell and the at least one another first battery cell facing each other,
wherein at least one another second battery cell of the plurality of battery cells is stacked with the second battery cell in the stacking direction, the side surfaces of the second battery cell and the at least one another second battery cell facing each other, and
wherein the second surfaces of the at least one another first battery cell and the at least one another second battery cell face each other, and
wherein a height of the battery array in the stacking direction is less than a length of a battery cell of the plurality of battery cells in a direction extending between the first and second ends.

5. The battery module of claim 3, further comprising an insulating plate between battery cells of the plurality of battery cells stacked adjacent one another.

6. The battery module of claim 3,
wherein the side surface is a first side surface, and each of the battery cells further comprises a second side surface opposite the first side surface and extending between the first and second ends, and
wherein the first and second fixing members are adjacent opposite outer second side surfaces of the stacked battery cells.

7. The battery module of claim 6, wherein at least one of the first and second fixing members comprises a plurality of bars.

8. The battery module of claim 6, wherein at least one of the first and second fixing members comprises a plate.

9. A battery module comprising a battery array comprising:
a plurality of battery cells, each having a generally hexahedral shape and comprising:
a first surface at a first end of the battery cell;
an electrode terminal at the first end;
a second surface at a second end of the battery cell opposite the first end; and
a side surface extending between the first and second ends,
wherein the second surfaces of first and second battery cells of the plurality of battery cells face each other,
wherein at least one another first battery cell of the plurality of battery cells is stacked over the first battery cell, the side surfaces of the first battery cell and the at least one another first battery cell facing each other,
wherein at least one another second battery cell of the plurality of battery cells is stacked over the second battery cell, the side surfaces of the second battery cell and the at least one another second battery cell facing each other,
wherein the second surfaces of the at least one another first battery cell and the at least one another second battery cell face each other,
wherein each of the battery cells has a generally hexahedral shape, the side surface is a first side surface, and each of the battery cells further comprises a second side surface opposite the first side surface and extending between the first and second ends,
wherein the battery module further comprises first and second fixing members adjacent opposite outer second side surfaces of the stacked battery cells, and
wherein the battery module further comprises a plurality of supporting members between the second surfaces of the first and second battery cells, wherein the plurality of supporting members are fixed between the first and second fixing members; and
wherein each of the supporting members comprises a thread-fastening portion, and the first and second fixing members have fastener holes for fastening the first and second fixing members to the thread-fastening portion.

10. The battery module of claim 9, wherein each of the supporting members comprises an insulating material, and the thread-fastening portion comprises a metal.

11. The battery module of claim 6,
wherein each of the battery cells further comprises a pair of third side surfaces opposite each other, extending between the first and second side surfaces, and extending between the first and second ends, and
wherein the battery module further comprises third fixing members adjacent the third side surfaces of battery cells of the stacked battery cells.

12. The battery module of claim 11, wherein each of the third fixing members has a plurality of heat dissipation holes spaced apart along a lengthwise direction.

13. The battery module of claim 1, further comprising end plates at opposite outer ends of the battery array adjacent the first ends of the battery cells, the end plates having terminal openings exposing the electrode terminals,
wherein each of the battery cells further comprises a vent at the first end, and the end plates have exhaust openings at locations corresponding to the vents.

14. The battery module of claim 1, wherein the battery module is configured for driving a motor of an electric vehicle or a hybrid electric vehicle.

15. The battery module of claim 1, wherein the battery module is electrically connected to at least one another battery module.

16. The battery module of claim 1, wherein the plurality of supporting members are spaced apart from each other.

17. The battery module of claim 16, wherein the plurality of supporting members are spaced apart in a direction perpendicular to a stacking direction.

* * * * *